(12) United States Patent
Luelfing et al.

(10) Patent No.: US 12,552,384 B2
(45) Date of Patent: Feb. 17, 2026

(54) METHOD AND DRIVING DYNAMICS SYSTEM FOR CONTROLLING A STARTING PROCESS OF A VEHICLE

(71) Applicant: WABCO GmbH, Hannover (DE)

(72) Inventors: Ralph-Carsten Luelfing, Garbsen (DE); Detlef Schmidt, Gehrden (DE); Ruppert Kamping, Hannover (DE); Thomas Lenz, Lehrte (DE); Tobias Munko, Hannover (DE); Stefan Selent, Nienburg (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 218 days.

(21) Appl. No.: 16/766,751

(22) PCT Filed: Sep. 7, 2018

(86) PCT No.: PCT/EP2018/074177
§ 371 (c)(1),
(2) Date: May 26, 2020

(87) PCT Pub. No.: WO2019/105618
PCT Pub. Date: Jun. 6, 2019

(65) Prior Publication Data
US 2020/0331478 A1    Oct. 22, 2020

(30) Foreign Application Priority Data

Nov. 30, 2017 (DE) ............... 10 2017 011 114.6

(51) Int. Cl.
*F16D 48/08* (2006.01)
*B60W 30/18* (2012.01)
*B60W 40/09* (2012.01)

(52) U.S. Cl.
CPC ...... *B60W 30/18172* (2013.01); *B60W 30/18027* (2013.01); *B60W 40/09* (2013.01);
(Continued)

(58) Field of Classification Search
CPC ..... B60W 30/18172; B60W 30/18027; B60W 40/09; B60W 2510/105; B60W 2510/182; B60W 2520/28; B60W 2520/40
See application file for complete search history.

(56) References Cited

U.S. PATENT DOCUMENTS

| 5,463,551 A | 10/1995 | Milunas |
|---|---|---|
| 6,182,002 B1 | 1/2001 | Bauerle |

(Continued)

FOREIGN PATENT DOCUMENTS

| DE | 19850978 A1 | 5/1999 |
|---|---|---|
| DE | 69507405 T2 | 6/1999 |

(Continued)

*Primary Examiner* — Ramya P Burgess
*Assistant Examiner* — Chanmin Park
(74) *Attorney, Agent, or Firm* — LEYDIG, VOIT & MAYER, LTD.

(57) ABSTRACT

A method for controlling a starting process of a vehicle includes activating a control sequence and setting a control sequence signal, defining a maximum engine drive torque, and detecting a drive request for a starting process. The method further includes, in response to the drive request, controlling a clutch-gearbox unit with an engagement process duration, controlling wheel slip of driven wheels by determining wheel speeds of the driven wheels and at least setting an output drive torque at the output shaft, and redefining the maximum engine drive torque depending on the wheel slip and a driving speed. The method also includes deactivating the control sequence and resetting the control sequence signal when limit values are reached.

20 Claims, 3 Drawing Sheets

(52) U.S. Cl.
CPC . *B60W 2510/105* (2013.01); *B60W 2510/182* (2013.01); *B60W 2520/28* (2013.01); *B60W 2520/40* (2013.01)

(56) References Cited

U.S. PATENT DOCUMENTS

| | | | |
|---|---|---|---|
| 6,250,448 B1 | 6/2001 | Salecker | |
| 6,321,154 B1* | 11/2001 | Schmitt | B60W 30/18027 |
| | | | 701/82 |
| 2002/0025882 A1* | 2/2002 | Schmitt | B60K 28/165 |
| | | | 477/83 |
| 2005/0064987 A1* | 3/2005 | Budal | F16D 29/005 |
| | | | 477/3 |
| 2005/0282683 A1* | 12/2005 | Tanba | B60W 30/18027 |
| | | | 477/180 |
| 2008/0053189 A1* | 3/2008 | Bell | G01R 31/2829 |
| | | | 73/1.37 |
| 2012/0025600 A1* | 2/2012 | Cabrera Carrillo | |
| | | | B60T 8/17636 |
| | | | 701/80 |
| 2013/0320900 A1* | 12/2013 | Daigle | B60L 15/2063 |
| | | | 318/434 |
| 2015/0175009 A1* | 6/2015 | Beever | B60L 15/36 |
| | | | 701/22 |
| 2017/0259827 A1* | 9/2017 | Miller, Jr. | B60T 8/175 |
| 2019/0113924 A1* | 4/2019 | Falconer | B60W 60/001 |
| 2019/0263392 A1* | 8/2019 | Imamura | B60K 17/35 |
| 2020/0207317 A1* | 7/2020 | Farres | B60T 8/92 |

FOREIGN PATENT DOCUMENTS

| | | |
|---|---|---|
| DE | 10222351 A1 | 11/2002 |
| DE | 10305297 A1 | 8/2004 |
| DE | 10305298 A1 | 8/2004 |
| DE | 102004044788 A1 | 4/2006 |
| DE | 102011018887 A1 | 10/2012 |
| DE | 19917437 A1 | 10/2020 |
| EP | 1125783 B1 | 7/2003 |
| EP | 1730006 B1 | 12/2012 |
| WO | WO 2007116123 A1 | 10/2007 |

* cited by examiner

METHOD AND DRIVING DYNAMICS SYSTEM FOR CONTROLLING A STARTING PROCESS OF A VEHICLE

CROSS REFERENCE TO RELATED APPLICATIONS

This application is a U.S. National Phase Application under 35 U.S.C. § 371 of International Application No. PCT/EP2018/074177, filed on Sep. 7, 2018, and claims benefit to German Patent Application No. DE 10 2017 011 114.6, filed on Nov. 30, 2017. The International Application was published in German on Jun. 6, 2019 as WO 2019/105618 under PCT Article 21(2).

FIELD

The invention relates to a method and a driving dynamics system for controlling a starting process of a vehicle.

BACKGROUND

Starting processes are particularly problematic on a road with a low coefficient of friction. Thus, in the case of unfavorable weather conditions such as ice or snow, increased slip on the wheels of the drive axle can occur at an early stage, even with careful starting of the vehicle.

In order to nevertheless enable a safe starting process with spinning wheels, drive slip control systems (ASR, ATC) are known, with which the slip of the driven wheels is measured and the wheels are braked depending on this slip, and/or the engine power is reduced to limit the slip.

Furthermore, differential locks are known, with which intervention is made into the distribution of the drive torque to the individual wheels.

However, it turns out that known drive slip control systems do not solve all problems during starting processes, especially at low adhesion values instabilities or reduced traction can still occur.

Thus, in known systems, control action is taken when a wheel speed is reached which, in the case of snow or ice as a driving surface, causes the driving surface to melt, which leads to a further reduction of the adhesion value due to the resulting water film.

Furthermore, known systems do not take any precautions to feed reduced drive torque to the drive wheels against the driver's wishes in the event of a low adhesion value in order to avoid excessive slip in advance.

U.S. Pat. No. 6,182,002 B1 describes a traction control system in which a wheel speed is determined based on the measured vehicle acceleration instead of the measured wheel speed. On determining that an acceleration has lasted too long, an engine torque is reduced.

From DE 69507405 T2, an engine torque control and anti-slip control method is known for reducing slip in the drive wheels of a motor vehicle. In this case, an ignition point is delayed depending on a reduced engine output torque in order to reduce a certain slip condition EP 1125783 B1 describes a method for controlling a powertrain of a motor vehicle with a wheel slip control system and an automatic transmission, in which the engagement of a clutch in the transmission is controlled on the basis of a signal generated by the wheel slip control system, wherein the signal represents the coefficient of friction between a vehicle wheel and a road surface and/or represents the actual engine speed.

EP1730006B1 reveals a method for providing brake pressure to the wheels of a moving vehicle while determining the presence of a dynamic vehicle condition in order to provide brake pressure to the vehicle wheels independently of the driver's braking command.

Here, a modulator is provided between the double brake valve and the driven wheel, which is controlled by the electronic control unit in order to selectively supply the driven wheel with brake pressure.

SUMMARY

In an embodiment, the present invention provides a method for controlling a starting process of a vehicle. The method includes activating a control sequence and setting a control sequence signal, defining a maximum engine drive torque, and detecting a drive request for a starting process. The method further includes, in response to the drive request, controlling a clutch-gearbox unit with an engagement process duration, controlling wheel slip of driven wheels by determining wheel speeds of the driven wheels and at least setting an output drive torque at the output shaft, and redefining the maximum engine drive torque depending on the wheel slip and a driving speed. The method also includes deactivating the control sequence and resetting the control sequence signal when limit values are reached.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The present disclosure describes a method and a driving dynamics system for controlling a starting process of a vehicle in such a way that a safe starting process with good traction is possible, especially at low adhesion values.

A driving dynamics system according to the invention is provided, in particular, for carrying out a method according to the invention. Furthermore, the method according to the invention is provided in particular with the aid of or using a driving dynamics system according to the invention.

According to the present disclosure, a gentle starting process can be set up even before the occurrence of the first slip or the instability. For this purpose, in particular the engine torque is determined which is sufficient to cause the vehicle start to drive without the wheels building up significant slip at the same time. Factors such as vehicle mass, road inclination, friction losses in the powertrain, desired vehicle acceleration, etc. can be used in the determination of the engine torque.

Preferably, the drive forces which are transferred from the driven wheels to the road are limited, according to the invention, and the slip is preferably controlled to a lower value than with known drive slip control systems.

According to a preferred embodiment, inclusion of the clutch control is carried out. This is also based on the maximum drive torque calculated for the engine control and limits the clutch torque accordingly during the engagement process and thus helps to avoid excessive slip on the drive wheels.

Furthermore, according to an advantageous development, a brake pressure can be controlled or regulated. Thus, the wheel brake can first be applied during starting and then released in a regulated or controlled manner. Here, a control sequence brake pressure can be set on wheel brakes of the driven wheels. In a preferred embodiment, the wheels which have slip before activating the control sequence are braked to a standstill.

The determination of the wheel slip is carried out by measuring the wheel speeds. Preferably, a measurement by means of active wheel speed sensors is provided, for example even for less than one wheel revolution. However, for example wheel revolution rates of the driven wheels measured by means of passive wheel speed sensors can also be used as wheel speeds.

With those embodiments where a control sequence brake pressure is set, it is initially maintained during the starting process. In this way, a rapid rise of the wheel speed before the control reduces the slip again is avoided when the slip is exceeded which generates a maximum adhesion value and subsequently a greatly decreasing adhesion value. Thus, higher control quality of the drive force and the slip of the drive wheels is achieved. Preferably, the control sequence brake pressure is slowly reduced during the starting process.

Thus, on the adhesion value-slip curve, which describes the adhesion value or the transferable force as a function of the wheel slip, the maximum value will preferably not be exceeded, but a starting process is set up for an adjusted, preferably optimal adhesion value. Thus, compared to a conventional ASR or ATC, a slower starting process is adjusted, which however takes place with high stability and good traction. With conventional ASR control, low adhesion values and low driving speeds may change the static friction or rolling friction into the lower sliding friction if the slip is increased too quickly.

The adhesion value (coefficient of friction) of the road can be determined based on the last braking process or based on the last braking and acceleration processes or alternatively based on the slip occurring during the current starting process, or it can be estimated as a low value. A low drive torque is set up on the drive shaft or the driven vehicle wheels, wherein the engine torque and/or the clutch-gearbox unit is/are preferably controlled using a function curve, which allows ramp control or a ramp function, for example depending on time or a wheel speed of the driven wheels.

In a starting process, control is carried out of a clutch-gearbox unit with an engagement process duration, which is greater than a standard engagement process duration provided in the event of a deactivated control sequence, wherein the standard engagement process duration can in turn be fixed or for example can also be learned or learned from previous engagement processes.

A determination of the adhesion value, in particular, also allows an automatic or independent activation, according to the invention, for the control of the starting process.

The control sequence is terminated on reaching limit values, for example a driving speed limit and/or an adhesion value limit, possibly also depending on a slip limit, and the control sequence signal is reset, so that following the control sequence of the starting process, normal drive slip control is carried out, for example.

The method for controlling the starting process can thus be integrated into a drive slip control method or placed before the same as a first step or included therein.

In the driving condition data, a determined road inclination can also be included, which is determined, for example, by using a longitudinal acceleration sensor and/or map material. Thus, the determined drive torque and/or the brake pressure are implemented in the first step of the starting process taking into account the road inclination and/or a determined or known vehicle mass.

The activation of the control sequence can be started, according to different embodiments, by activation by the driver, i.e. if for example the driver operates an activation means and thus specifically selects the gentle starting process. In addition or alternatively, this can also be chosen on determining such a vehicle condition or road condition, wherein for example a determined adhesion value (coefficient of friction), the vehicle mass, the road inclination are included for this purpose.

If the control sequence is active, depending on the vehicle mass or the load on the driven axle, the determined or assumed adhesion values of the tires to the driving surface and the road inclination, a maximum engine drive torque is defined which is less than the maximum engine drive torque when the control sequence is deactivated. In some embodiments, an adhesion value between the driven wheels and the road is determined by using axle load data of the driven wheels and determination of the slip occurring for the introduction of a known drive torque into the drive axle.

In addition, the clutch control can also relate to the defined engine drive torque, which is less than the maximum engine drive torque with the control sequence inactive. For this purpose, a higher value is set for the engagement process duration, which may be determined depending on the last named parameters such as vehicle mass and adhesion value or adhesion value as the value for the standard engagement duration when the control sequence is deactivated.

In addition, by setting a control sequence signal the control sequence brake pressure is applied to the brakes of the driven wheels after the wheels which may still be rotating have been braked to a standstill.

Thus, the drive force applied to the road by the driven wheels is reduced and increased more slowly than when the control sequence is deactivated.

The initial sustained high slip of a starting process without the control sequence, which reduces the adhesion value, is avoided.

If, however, a slip occurs which is so high that the adhesion value is reduced, the slip is lower and the reduction of the adhesion value is less than without the control sequence according to the invention. The drive force transferable to the road is increased by the control sequence according to the invention, especially at low adhesion values and in particular with snow or ice as a driving surface.

According to the disclosure, implementation is thus possible just by limiting the engine torque. A first extension is preferably the inclusion of the clutch control. A second extension is preferably the additional inclusion of the brake control.

Figure 1:
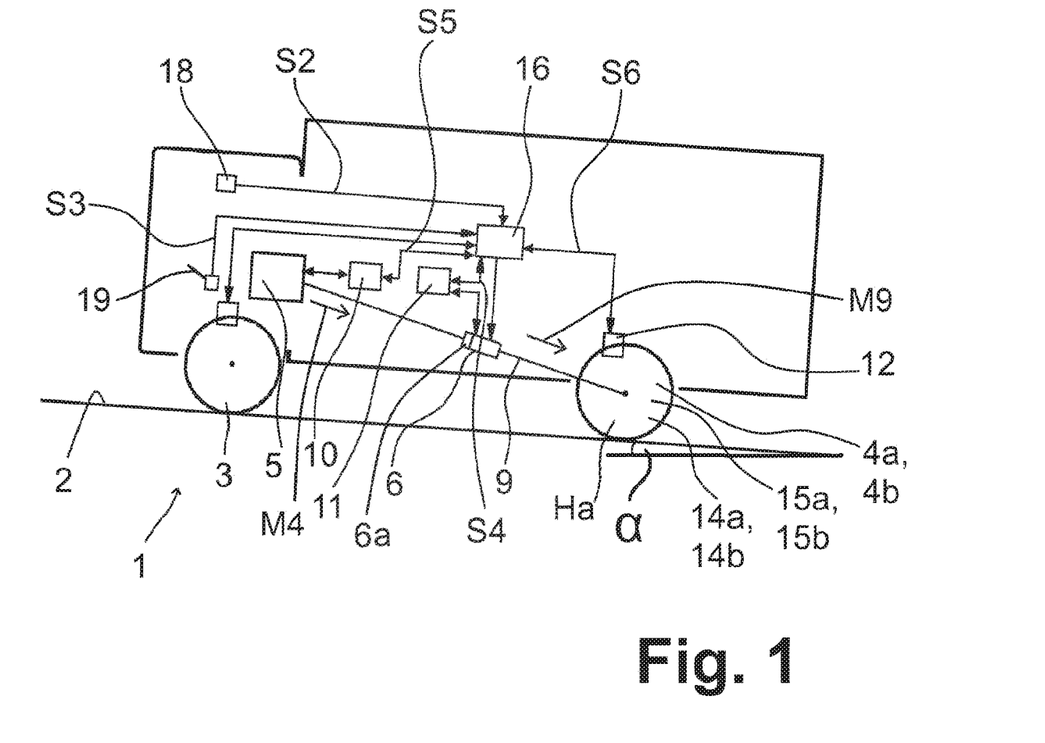
FIG. 1 shows a vehicle, on a road, with a driving dynamics control system according to an embodiment.

According to FIG. 1, a commercial vehicle 1 is stationary on a road 2, which has an inclination angle $\alpha$ relative to the horizontal A. The vehicle 1 is thus at a standstill, i.e. the driving speed v is 0, further the wheels 3 of the non-driven front axle Va and the rear wheels 4a, 4b of the driven rear axle Ha are stationary, that is, the wheel speeds n3 and n4a, n4b are 0. The road 2 has a low adhesion value (coefficient of friction) μ, for example due to smooth ice or snow.

Figure 4:
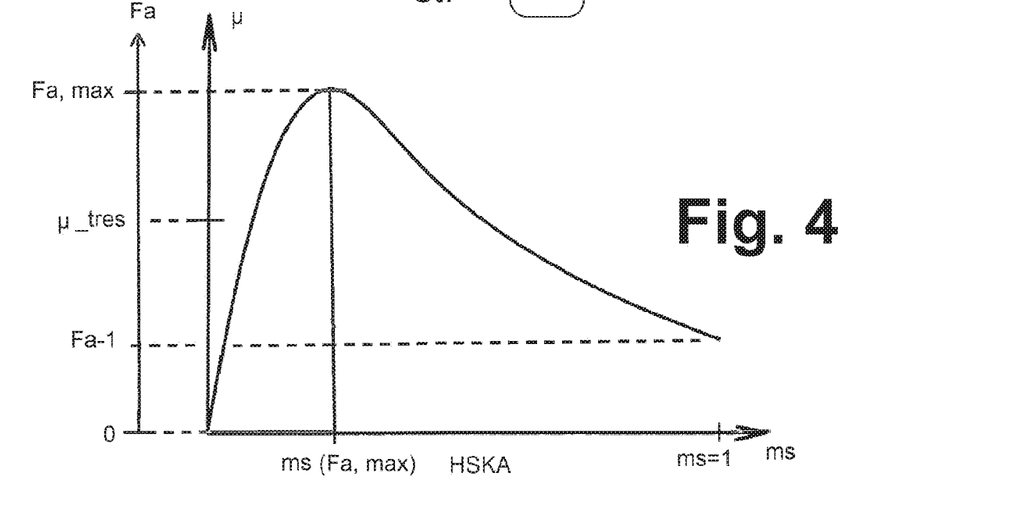
FIG. 4 shows an adhesion value-slip curve.

In FIG. 4 slip values ms are shown on the abscissa, adhesion values μ are shown on the right ordinate, and a wheel force Fa transferable from the tires, i.e. a braking force and an acceleration force, is shown to the left thereof on another ordinate. Thus, in a conventional starting process with spinning rear wheels 4a, 4b a slip ms=1 is formed, which only allows the transmission of a standard wheel force Fa-1. By contrast, according to the invention a maximum practical force Fa, max is achieved at a target slip ms (Fa, max) in this embodiment, i.e. not at a standstill but with some slip; after that, to the right of the target slip ms (Fa, max) the unstable branch HSKA of the adhesion value-slip curve starts, which according to the invention is preferably not followed.

The commercial vehicle 1 has an engine and a clutch-gearbox unit 6, so that the powertrain is formed by the engine 5, the clutch-gearbox unit 6 and an output shaft 9, by means of which the rear wheels 4a, 4b are driven. The clutch-gearbox unit 6 has a clutch 6a, which is engaged or meshed to form an effective connection and is disengaged to decouple the rear wheels 4a, 4b from the engine 5. In some embodiments, after the activation of the control sequence, the clutch-gearbox unit disengages a clutch.

The engine 5 is controlled by an engine control device 10; accordingly, the clutch-gearbox unit 6 is controlled by a gearbox control device 11. Furthermore, a brake control device 12 is provided, which performs different tasks and implements different braking control systems in the—here only indicated—braking systems 13 of the commercial vehicle and here controls, among other things, the rear wheel brakes 14a and 14b on the rear wheels 4a and 4b and receives wheel speed signals, in particular wheel speed signals n4a and n4b from wheel speed sensors 15a, 15b on the two rear wheels 4a, 4b. Here, advantageously active wheel speed sensors 15a, 15b can be used, which thus not only passively detect a magnetic signal of an identification disc rotating with the rear wheels 4a, 4b, but by active signal acquisition detect the wheel speeds more precisely, for example already at very low driving speeds v of 3 km/h or correspondingly small wheel speeds. The interaction of the aforementioned control devices 10, 11, 12 together with the driving dynamics control device 16 and the systems controlled by the control devices 10, 11, 12, 16 form the driving dynamics system 7. In some embodiments, the different wheel brakes of the driven wheels are part of a service brake and/or a parking brake.

Figure 2:
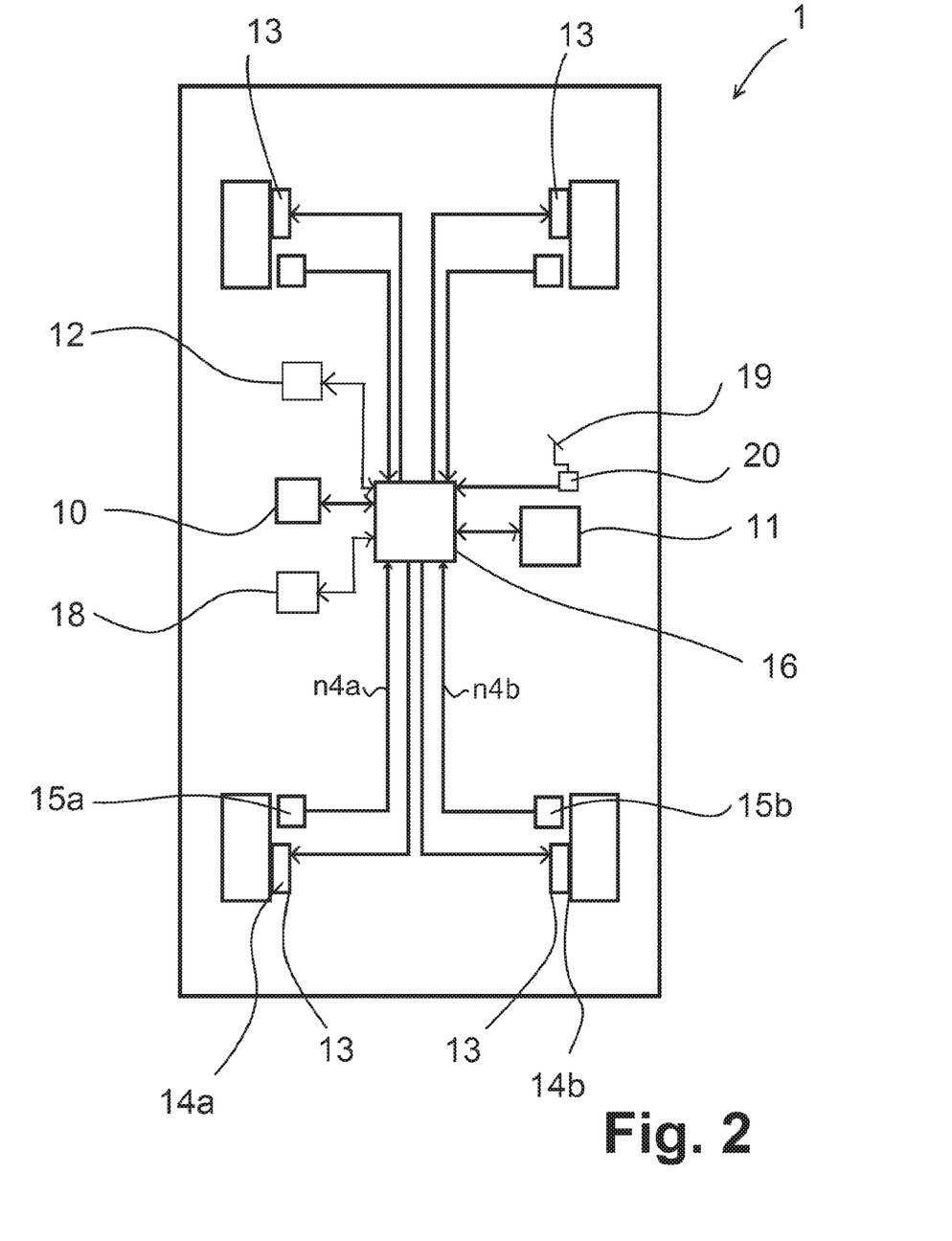
FIG. 2 shows a vehicle with a device according to an embodiment.

According to the block diagram of FIG. 2, a driving dynamics control system 16 for carrying out the method according to the invention is shown as a separate unit; it may be in particular be integrated in one of the other control devices, in particular the brake control device 12. The driving dynamics control device 16 performs a method for controlling a starting process, wherein for this purpose it receives different signals and can output different control signals according to different embodiments:

In general, the driving dynamics control device 16 is switched on with the ignition or the ignition signal S1, whereas the control sequence is not started. Furthermore, according to one embodiment, an operating device 18 can be provided in the dashboard of the commercial vehicle 1, which the driver actively operates and thereby outputs an activation signal S2 to the driving dynamics control device 16 and as a result switches on the driving dynamics control device 16. Furthermore, the driving dynamics control device 16 receives a gas pedal signal S3, which is output when the gas pedal 19 is operated via a gas pedal control device 20. The driving dynamics control device 16 continues to receive the wheel speed signals n4a, n4b and outputs a gearbox request signal S4 to the gearbox control device 11, as well as outputting an engine torque request signal S5 to the engine control device 10 and an ATC request signal S6 to the brake control device 12.

Here, the aforementioned signals can be transmitted in particular via the CAN bus within the vehicle, so that for example the wheel speed signals n4a, n4b are read in in a known manner by the brake control device 12 and are made available via the CAN bus to other systems in the vehicle, thus here also the driving dynamics control device 16.

The driving dynamics control device 16 may be integrated in particular in one of the other control devices, in particular in the brake control device 12. Furthermore, it may be integrated in a driving dynamics control device which implements further driving dynamics control systems, such as an FDR control or an ESP control, which is generally provided in the vehicle in addition to the brake control device and the other control devices.

Furthermore, the driving dynamics control device 16 advantageously receives—in addition to the wheel speed signals n4a, n4b—a driving speed signal v, which is either measured and/or provided as an ABS reference speed, for example by the brake control device 12, so that it can also determine therefrom the dynamic adhesion values μd of the rear wheels 4a and 4b, or this slip can also be received as a signal directly via the CAN bus if appropriate. Furthermore, the driving dynamics control device 16 advantageously receives the vehicle mass m and the axle load of the driven axle, which has either been measured in advance or is available as an estimate, for example.

Figure 3:
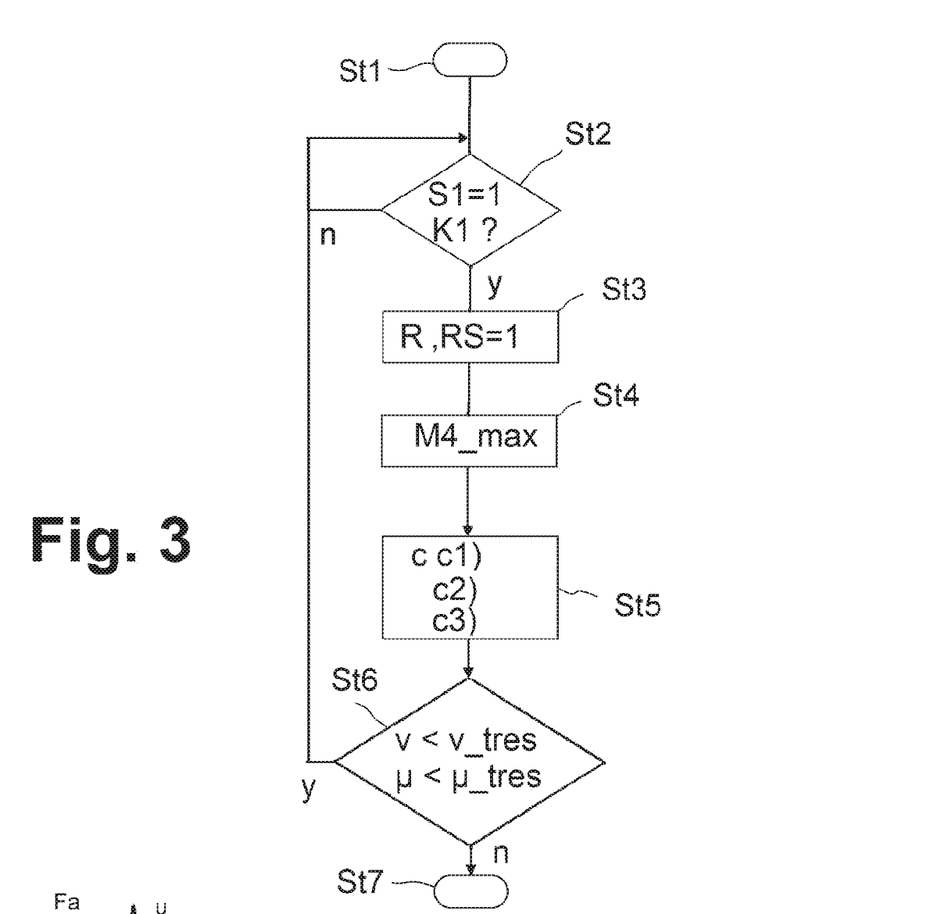
FIG. 3 shows a flowchart of a method according to an embodiment.

A method for controlling a starting process according to the flow diagram of FIG. 3 is described below with the driving dynamics system 7, which has the driving dynamics control device 16 and the aforementioned components:

After the start in step St1, the method is then continued in step St2 in particular, if the ignition is switched on, i.e. if the ignition signal S is present, and preferably also on fulfilling a decision criterion K1, which may include for example determined vehicle condition data, for example one or more from the group: a driver request for a starting process is present, the wheel slip ms is greater than a defined wheel slip limit ms_max, and a low adhesion value (μ).

Thus, in step St3 a control sequence R is started, and a control sequence signal RS is set, i.e. RS=1.

Subsequently, from step St4, different embodiments of the method are possible, with which brake pressure control can be carried out; but embodiments without brake pressure controls are also possible.

According to a first embodiment, the brake pressure P4a and P4b for the two rear wheel brakes 14a and 14b can initially be set the same and in St4 a maximum permissible engine drive torque M4_max can be defined. Then, in step St5 the brake pressure is controlled separately when wheel slip (ms) is starting to increase. Thus, here in principle the start of an ASR or a drive slip control is carried out, in which spinning of one of the driven rear wheels 4a, 4b is separately controlled by respective braking. In step St5, several substeps are performed, including c) detecting a drive request for a starting process, and in response to the drive request: c1) controlling a clutch-gearbox unit with an engagement process duration greater than a standard engagement process duration provided for when the control sequence is deactivated, c2) controlling wheel slip of driven wheels by determining wheel speeds of the driven wheels and at least setting an output drive torque at the output shaft, and c3) redefining the maximum engine drive torque depending on the wheel slip and a driving speed.

Alternatively, however, also in case of the occurrence of greater wheel slip ms, for example on the first rear wheel 4a, that is n4a>n4b, the brake pressure P on the other rear wheel 4b can be reduced. This can therefore be done in step St5. Thus, the rear wheel—here 4a—that is spinning or displaying higher slip is not braked here, but the brake pressure P on the other rear wheel—here 4b—is reduced in order to achieve a more uniform slip formation and to increase the transferred drive force Fa. This can in particular also be designed as an alternative to a transverse differential lock.

These two embodiments of the separate ASR control of each rear wheel 4a, 4b and the reduction of the brake pressure P on each of the wheels at which the lower slip is present can also be combined.

According to one design, in step St6 on reaching limit values such as a driving speed limit v_tres and/or an adhesion value limit u-tres the control sequence is deactivated and the control sequence signal RS is reset, i.e. RS=0, and the method terminates in step S7, otherwise the control is carried out again, i.e. in this case is reset to before step St2. In some embodiments, the limit values when the control sequence signal is set are smaller than when the control sequence signal is not set.

Thus, according to a preferred design, the control is performed entirely in FIG. 4 in the first, safe branch before the maximum value Fa_max. For example, the starting process can be carried out at adhesion values up to an adhesion value limit of μ_tres and/or until reaching the speed limit v_tres, after which the control sequence of the starting process is terminated and a journey is carried out with a conventional ASR or ATC, for example. Thus, specifically a somewhat slower starting process is achieved and the control is not carried out around the maximal value Fa, max; as a result, it is ensured according to the invention that the unstable branch is not followed and thus no slip with spinning of the wheels can occur on an incline, for example.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS 1 vehicle, in particular commercial vehicle
2 road
3 front wheels
4a, 4b driven rear wheels
5 engine
6 clutch-gearbox unit, for example for automatic transmission
7 driving dynamics system
9 output shaft
10 engine control device
11 gearbox control device
12 brake control device
13 braking system
14a, 14b wheel brakes of the driven rear wheels
15a, 15b wheel speed sensors on the rear wheels 4a, 4b
16 driving dynamics control device
18 operating device
19 gas pedal
20 gas pedal control device
S1 ignition signal
S2 activation signal
S3 gas pedal signal
S4 gearbox control request signal
S5 engine torque request signal
S6 ATC request signal;
α inclination of the road, road inclination
μ static adhesion value (coefficient of friction) of the road 2 to the wheels 3, 4a, 4b
μd dynamic adhesion value of the road 2 to the wheels 3, 4a, 4b
A horizontal
E engagement process
Fa drive force
Fa, max maximum transferable force
Ha rear axle
HSKA the unstable branch
k1 decision criterion
ms wheel slip of rear wheels 4a, 4b
ms (Fa, max) target slip
M4 engine drive torque
M4_max maximum engine drive torque
M9 output drive torque
n3 wheel speed of the front wheels (3)
n4a, n4b wheel speed of the rear wheels (4a, 4b)
P brake pressure
P4a, P4b brake pressure for the two rear brakes
R control sequence
PR control sequence brake pressure
RS control sequence signal
tc engagement process duration
tcs standard engagement process duration
t time
v driving speed
Va front axle Va
v_tres driving speed limit
μ_tres adhesion value limit

The invention claimed is:
1. A method for controlling a movement starting process of a vehicle before adhesion of a driven wheel of the vehicle begins to decrease, the method comprising:

a) activating a control sequence and setting a control sequence signal and defining a limit adhesion value, the limit adhesion value corresponding to an adhesion value on an adhesion value-slip curve for the driven wheel before the driven wheel's adhesion decreases with increasing slip;
b) defining a maximum engine drive torque that is less than a maximum engine drive torque when the control sequence is deactivated;
c) detecting a drive request for the movement starting process, and in response to the drive request, carrying out the following steps before adhesion of the driven wheel of the vehicle begins to decrease:
   c1) controlling a clutch-gearbox unit with an engagement process duration greater than a standard engagement process duration provided for when the control sequence is deactivated,
   c2) controlling a wheel slip value of the driven wheel by determining wheel speeds of the driven wheel and non-driven wheels and at least setting an output drive torque at the output shaft, wherein setting the output drive torque includes controlling at least the clutch-gearbox unit, and
   c3) redefining the maximum engine drive torque depending on the wheel slip value and a driving speed; and
d) deactivating the control sequence and resetting the control sequence signal when a maximum value of a driving force applied to a road by the driven wheel and the limit adhesion value are reached, such that the driving force applied to the road by the driven wheel does not decrease with increased driving speed during the control sequence.

2. The method as claimed in claim 1, wherein after the activation of the control sequence the clutch-gearbox unit disengages a clutch.

3. The method as claimed in claim 1, wherein before the controlling the wheel slip value of the driven wheels, the method further comprises:
   a1) applying a control sequence brake pressure to wheel brakes of the driven wheels, and
   wherein after controlling the wheel slip value of the driven wheels, the method further comprises:
   c2a) reducing a brake pressure on the wheel brakes of the driven wheels.

4. The method as claimed in claim 1, wherein before applying a control sequence brake pressure to the wheel brakes of the driven wheels, the brake pressure is increased so that the driven wheels come to a standstill.

5. The method as claimed in claim 1, wherein, in c2), the setting of the output drive torque at the output shaft is carried out by controlling at least a gearbox-transmission unit.

6. The method as claimed in claim 1, wherein during the controlling the wheel slip value of the driven wheels by setting the output drive torque includes controlling an engine of the vehicle.

7. The method as claimed in claim 1, wherein the controlling the wheel slip value of the driven wheels by setting the output drive torque includes controlling the brake pressure of the driven wheels.

8. The method as claimed in claim 7, wherein the controlling the brake pressure of the driven wheels includes carrying out a reduction of the brake pressure as a function of time or as a function of the wheel speed.

9. The method as claimed in claim 1, wherein, upon determining a greater slip on a first driven wheel, a brake pressure is lowered on the other driven wheel of a same axle.

10. The method as claimed in claim 1, wherein the activation of the control sequence is carried out when an activation signal is input by the driver.

11. The method as claimed in claim 1, wherein the activation of the control sequence is carried out, upon fulfilling a decision criterion, depending on determined vehicle condition data including one or more of the group consisting of:
   the presence of a driver request for a movement starting process,
   the wheel slip value being greater than a defined wheel slip limit value, and
   the presence of a low adhesion value.

12. The method as claimed in claim 11, wherein drive forces transferable to the road are determined based on a slip of the last braking process or a slip of the last braking and acceleration processes.

13. The method as claimed in claim 1, wherein during c2), stored adhesion value-slip curves are used for setting the slip which generates a maximum adhesion value.

14. The method as claimed in claim 1, wherein the defining a maximum drive torque during b) and/or the redefining a maximum drive torque during c3), an adhesion value between the driven wheels and the road is determined by using axle load data of the driven wheels and determination of the slip occurring for the introduction of a known drive torque into the drive axle.

15. The method as claimed in claim 1, wherein the maximum values when the control sequence signal is set are smaller than when the control sequence signal is not set.

16. A driving dynamics system for controlling or regulating a movement starting process of a vehicle before adhesion of a driven wheel of the vehicle begins to decrease, the driving dynamics system comprising:
   wheel speed sensors configured to output wheel speed signals corresponding to driven wheels of the vehicle,
   a driving dynamics controller configured to receive a gas pedal signal and the wheel speed signals and configured to output request signals to a drive unit of the vehicle,
   wherein the driving dynamics controller is configured to:
   activate a control sequence and set a control sequence signal before adhesion of the driven wheel of the vehicle begins to decrease with increased slip, and defining a limit adhesion value corresponding to an adhesion value on an adhesion value-slip curve for the driven wheel before the driven wheel's adhesion decreases with increasing slip;
   define a maximum engine drive torque that is less than a maximum engine drive torque when the control sequence is deactivated;
   detect a drive request for the movement starting process, and in response to the drive request, carry out the following steps before adhesion of the driven wheel of the vehicle begins to decrease:
      control a clutch-gearbox unit with an engagement process duration greater than a standard engagement process duration provided for when the control sequence is deactivated,
      control a wheel slip value of the driven wheel based on the wheel speed of the driven wheel and at least set an output drive torque at the output shaft, and
      redefine the maximum engine drive torque depending on the wheel slip value and a driving speed; and
   deactivate the control sequence and reset the control sequence signal when a maximum value of a driving force applied to a road by the driven wheel and a limit adhesion value are reached, such that the driving force applied to the road by the driven wheel does not decrease with increased driving speed with increased driving speed during the control sequence, wherein the driving dynamics controller is configured to output an ATC request signal to a brake control device.

17. The driving dynamics system as claimed in claim 16, wherein the driving dynamics controller is configured to output a gearbox control request signal to a gearbox control device and/or to output an engine torque request signal to an engine control unit.

18. The driving dynamics system according to claim 16, wherein the wheel brakes of the driven wheels are part of a service brake and/or a parking brake.

19. The driving dynamics system according to claim 16, wherein the wheel speed sensors are active wheel speed sensors.

20. A method for controlling a movement starting process of a vehicle before adhesion of a driven wheel of the vehicle begins to decrease, the method comprising:
- a) activating a control sequence and setting a control sequence signal and defining a limit adhesion value, the limit adhesion value corresponding to an adhesion value on an adhesion value-slip curve for the driven wheel before the driven wheel's adhesion decreases with increasing slip;
- b) defining a maximum engine drive torque that is less than a maximum engine drive torque when the control sequence is deactivated;
- c) detecting a drive request for the movement starting process, and in response to the drive request, carrying out the following steps before adhesion of the driven wheel of the vehicle begins to decrease:
  - c1) controlling a clutch-gearbox unit with an engagement process duration greater than a standard engagement process duration provided for when the control sequence is deactivated,
  - c2) controlling a wheel slip value of the driven wheel by determining wheel speeds of the driven wheel and non-driven wheels and at least setting an output drive torque at the output shaft, wherein setting the output drive torque includes controlling at least the clutch-gearbox unit by engaging a clutch with a ramp function dependent on time or the wheel speeds of the driven wheels and
  - c3) redefining the maximum engine drive torque depending on the wheel slip value and a driving speed; and
- d) deactivating the control sequence and resetting the control sequence signal when a maximum value of a driving force applied to a road by the driven wheel and the limit adhesion value are reached, such that the driving force applied to the road by the driven wheel does not decrease with increased driving speed during the control sequence.

* * * * *